US012245648B2

(12) United States Patent
Facer et al.

(10) Patent No.: US 12,245,648 B2
(45) Date of Patent: *Mar. 11, 2025

(54) MAINTENANCE-FREE RESPIRATOR THAT HAS CONCAVE PORTIONS ON OPPOSING SIDES OF MASK TOP SECTION

(71) Applicant: 3M INNOVATIVE PROPERTIES COMPANY, St. Paul, MN (US)

(72) Inventors: John M. Facer, Langley Park (GB); Christopher P. Henderson, Penrith (GB); Peter S. Leonard, Newton Ayecliffe (GB); Desmond T. Curran, Durham (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,392

(22) Filed: Jul. 24, 2023

(65) Prior Publication Data

US 2023/0363475 A1 Nov. 16, 2023

Related U.S. Application Data

(63) Continuation of application No. 16/948,919, filed on Oct. 6, 2020, now Pat. No. 11,877,604, which is a continuation of application No. 15/726,723, filed on Oct. 6, 2017, now Pat. No. 10,827,787, which is a continuation of application No. 11/743,734, filed on May 3, 2007, now abandoned.

(51) Int. Cl.

| | |
|---|---|
| *A41D 13/11* | (2006.01) |
| *A62B 18/02* | (2006.01) |
| *A62B 23/02* | (2006.01) |

(52) U.S. Cl.

CPC .......... *A41D 13/11* (2013.01); *A41D 13/1107* (2013.01); *A62B 18/025* (2013.01); *A62B 23/025* (2013.01)

(58) Field of Classification Search

CPC ........ A41D 13/11-1192; A62B 18/025; A62B 23/025; A61M 16/06; A61M 2016/0605; A61M 2016/0661

See application file for complete search history.

(56) References Cited

U.S. PATENT DOCUMENTS

| | | | | |
|---|---|---|---|---|
| 5,704,063 A * | 1/1998 | Tilden ................ | A41D 13/1161 | 2/427 |
| 6,102,040 A * | 8/2000 | Tayebi ............... | A41D 13/1115 | 128/205.27 |
| 2003/0015201 A1* | 1/2003 | Bostock ............. | A41D 13/1115 | 128/206.21 |

(Continued)

*Primary Examiner* — Valerie L Woodward

(57) ABSTRACT

A maintenance-free respirator 10 that includes a mask harness and a mask body 11. The mask body 11 has at least one layer of filter media 56 and has a perimeter 32 that includes an upper segment 34. The upper segment 34 includes first and second concave segments 36, 38 that are located, respectively, on first and second sides of a central plane 40, when viewing the mask body from a top view. A maintenance-free respirator 10 of this configuration is comfortable to wear and can provide a snug fit to a wearer's face, particularly beneath each of the wearer's eyes, while at the same time having an ability to improve compatibility with various protective eyewear.

8 Claims, 4 Drawing Sheets

(56) References Cited

U.S. PATENT DOCUMENTS

| | | | | |
|---|---|---|---|---|
| 2004/0011362 | A1 * | 1/2004 | Angadjivand ..... | A41D 13/1146<br>128/206.13 |
| 2004/0255946 | A1 * | 12/2004 | Gerson ............. | A41D 13/1123<br>128/205.27 |

* cited by examiner

MAINTENANCE-FREE RESPIRATOR THAT HAS CONCAVE PORTIONS ON OPPOSING SIDES OF MASK TOP SECTION

The present invention pertains to a maintenance-free respirator that has a perimeter that includes first and second concave segments that are located on the top section of the mask body. The concave segments are disposed on opposing sides of a central plane that bisects the mask body.

BACKGROUND

Maintenance-free respirators (sometimes referred to as "filtering face masks" or "filtering face pieces") are worn over the breathing passages of a person for two common purposes: (1) to prevent impurities or contaminants from entering the wearer's breathing track; and (2) to protect other persons or things from being exposed to pathogens and other contaminants exhaled by the wearer. In the first situation, the maintenance-free respirator is worn in an environment where the air contains particles that are harmful to the wearer, for example, in an auto body shop. In the second situation, the respirator is worn in an environment where there is risk of contamination to others persons or things, for example, in an operating room or clean room.

Unlike respirators that use rubber or elastomeric mask bodies and attachable filter cartridges or insert-molded filter elements (see, e.g., U.S. Pat. No. 4,790,306 to Braun), maintenance-free respirators have the filter media incorporated into the mask body so that there is no need for installing or replacing filter cartridges. As such, maintenance-free respirators are relatively light in weight and easy to use.

To achieve either of the purposes noted above, the maintenance-free respirator should be comfortable and be able to maintain a snug fit when placed on the wearer's face. Known maintenance-free respirators can, for the most part, match the contour of a person's face over the cheeks and chin. In the nose region, however, there is a complex change in contour, which makes a snug fit more challenging to achieve, particularly over the nose and beneath each eye of the wearer. Failure to obtain a snug fit on this part of a wearer's face can allow air to enter or exit the respirator interior without passing through the filter media. If such an event were to occur, contaminants could possibly enter the wearer's breathing track or other persons or things could be exposed to contaminants exhaled by the wearer. In addition, the wearer's eyewear may become fogged, which, of course, makes visibility more troublesome to the wearer and creates unsafe conditions for the user and others.

Maintenance-free respirator users often also need to wear protective eyewear. When wearing a respirator in conjunction with protective eyewear, there sometimes can be conflicts between these two personal safety articles. The respirator may, for example, hinder the eyewear from properly resting on the wearer's face.

Nose clips are commonly used on respirators to achieve a snug fit over the wearer's nose. Conventional nose clips have used a malleable, linear, strip of aluminum—see, for example, U.S. Pat. Nos. 5,307,796, 4,600,002, 3,603,315; see also U.K. Patent Application GB 2,103,491 A. More recent products have used an "M" shaped band of malleable metal to improve fit in the nose area—see U.S. Pat. No. 5,558,089 and Des. 412,573 to Castiglione—or spring loaded and deformable plastics—see U.S. Publication No. US2007/0044803A1 and U.S. patent application Ser. No. 11/236,283. Nose foams also have been used on the top section of the mask to improve wearer comfort and fit—see U.S. patent application Ser. Nos. 11/553,082 and 11/459,949.

Although nose clips and nose foams do assist in improving comfort and in providing a snug fit over the wearer's nose, there nonetheless may be room for improvement in comfort and fit in the region beneath each of the wearer's eyes. If such improvements in comfort and fit can be achieved by altering the structure of the mask body, the respirator wearer is less likely to displace the mask from their face when in a contaminated environment. Fit improvements also may help alleviate conflicts between maintenance-free respirators and protective eyewear.

SUMMARY OF THE INVENTION

The present invention is directed to improving the compatibility between maintenance-free respirators and protective eyewear while still achieving a snug fit over the wearer's nose and eyes. The inventive maintenance-free respirator comprises a mask body that includes at least one layer of filter media. The mask body also has a perimeter that includes an upper segment that has first and second concave segments located, respectively, on first and second sides of a central plane when viewing the mask body from a top view. A harness is secured to the mask body so that it can be supported on a wearer's face.

The present invention differs from conventional respirators in that the mask body is sculpted along the upper segment of the perimeter. The mask body includes first and second concave segments that are located on opposing sides of a central plane that bisects a top view of the mask. The concave segments resemble "dips" or "cut-outs" in the path traced by the mask body perimeter when viewed through a plane projected onto the top of the mask body (see FIG. 5*a*). In conventional maintenance-free respirators, the perimeter primarily exhibited only a generally straight line or perhaps a constant arc when viewed through such a plane. By reconfiguring the mask body over the nose region and beneath the eyes, the inventors discovered that a good, comfortable, snug fit may be achieved while also preventing fogging of the wearer's eyewear and improving the compatibility between a maintenance-free respirator and the protective eyewear.

GLOSSARY

As used in this document, the following terms are defined as set below:

- "central plane" means a plane that bisects the mask normally or perpendicular to its crosswise dimension;
- "clean air" means a volume of atmospheric ambient air that has been filtered to remove contaminants;
- "comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is semi open-ended term in that it excludes only those things or elements that would have a deleterious effect on the performance of the inventive maintenance-free respirator in serving its intended function;
- "concave" means that a line tangent to the path of the perimeter segment decreases in slope and then increases in slope when moving along the perimeter path from left to right in the "y" direction (FIG. 5*a*);

"contaminants" means particles (including dusts, mists, and fumes) and/or other substances that generally may not be considered to be particles (e.g., organic vapors, et cetera) but which may be suspended in air, including air in an exhale flow stream;

"crosswise dimension" is the dimension that extends across a wearer's nose when the respirator is worn; it is synonymous with the "lengthwise" dimension of the mask body ("y" direction noted in FIG. 5*a*);

"exterior gas space" means the ambient atmospheric gas space into which exhaled gas enters after passing through and beyond the mask body and/or exhalation valve;

"filter" or "filtration layer" means one or more layers of material, which layer(s) is adapted for the primary purpose of removing contaminants (such as particles) from an air stream that passes through it;

"filter media" means an air-permeable structure that is designed to remove contaminants from air that passes through it;

"harness" means a structure or combination of parts that assists in supporting a mask body on a wearer's face;

"interior gas space" means the space between a mask body and a person's face;

"line of demarcation" means a fold, seam, weld line, bond line, stitch line, hinge line, and/or any combination thereof;

"maintenance-free" means that the mask body itself is designed to filter air that passes through it—there are no separately identifiable filter cartridges or inserted-molded filter elements attached to or molded into the mask body to achieve this purpose;

"mask body" means an air-permeable structure that can fit at least over the nose and mouth of a person and that helps define an interior gas space separated from an exterior gas space;

"molded" means causing the element being molded (for example, the shaping layer) to take on a predefined form after being exposed to heat and/or pressure;

"nose clip" means a mechanical device—other than a nose foam—which device is adapted for use on a mask body to improve the seal at least around a wearer's nose;

"nose foam" means a foam-type material that is adapted for placement on the interior of a mask body to improve fit and/or wearer comfort over the nose when the respirator is being worn by a person;

"nose region" means the portion that resides over a person's nose when the respirator is worn;

"perimeter" means the outer edge of the mask body, which outer edge would be disposed proximate to a wearer's face when the respirator is being donned by a person;

"respirator" means a device that is worn by a person to filter air before the air enters the wearer's respiratory system;

"shaping layer" means a layer that has sufficient structural integrity to retain its desired shape (and the shape of other layers that are supported by it) under normal handling;

"top section" means the portion that is located on the upper half of the mask body and that would extend over the nose and beneath the eyes when the respirator is being worn;

"top view" means the view that when projected onto a plane (as seen in FIG. 5*a*) the perimeter or rear of the mask body is located towards the top of the page and the front faces the bottom;

"upper segment" means the part of the perimeter that extends over the nose region and under the wearer's eyes when the respirator is being worn; and "without any imposed conformance from a deformed nose clip" means that the mask has this shape without it being deformed or shaped through nose clip deformation.

DETAILED DESCRIPTION OF PREFERRED EMBODIMENTS

Figure 1:
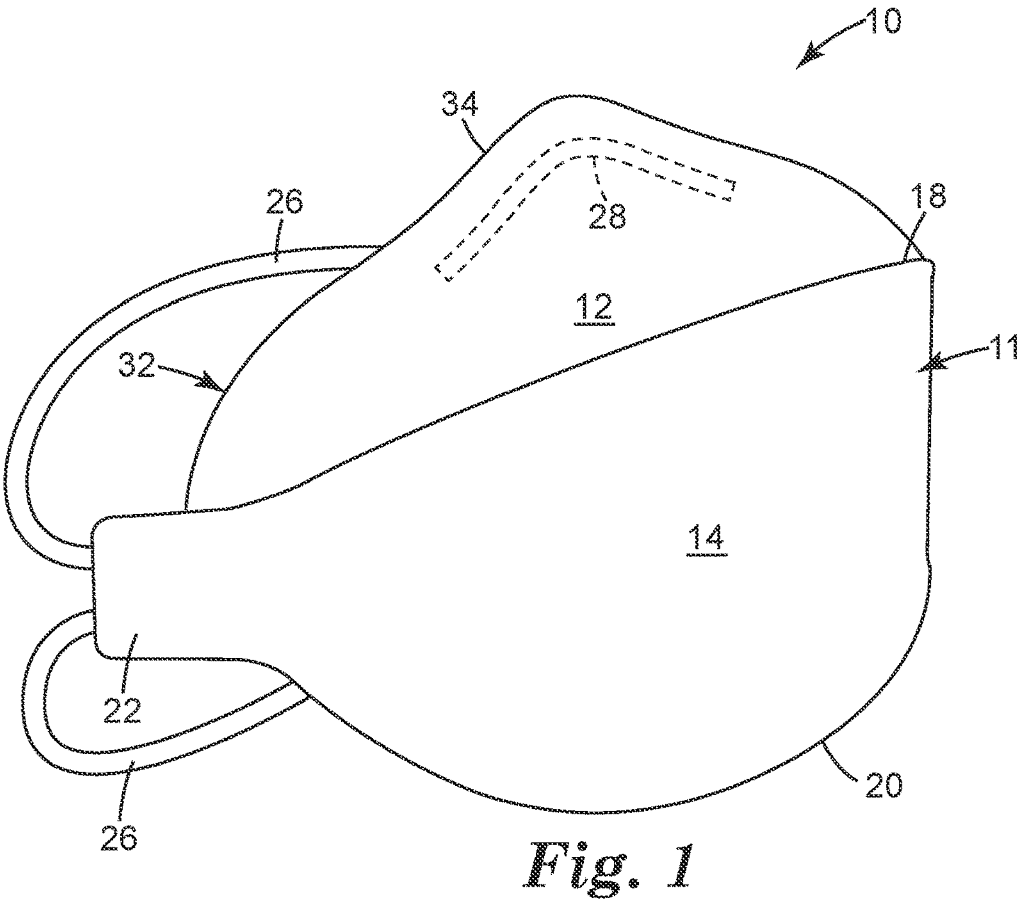
FIG. 1 illustrates a perspective view of an exemplary respirator 10 in accordance with the present invention.
Figure 2:
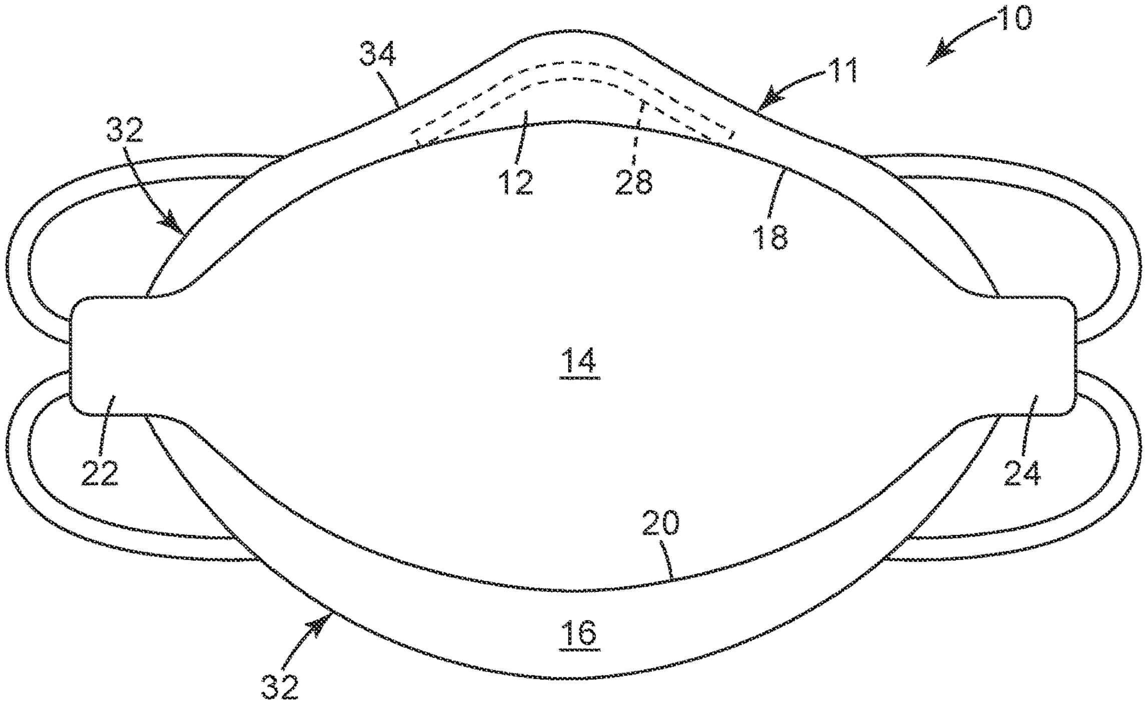
FIG. 2 illustrates a front view of the respirator 10 in accordance with the present invention.

In the practice of the present invention, a new maintenance-free respiratory mask is provided which addresses the need for improved comfort and fit in the top section of the mask. In so doing, the inventive respirator is given a perimeter that includes an upper segment that comprises first and second concave segments. These concave segments are located respectively on first and second sides of a bisecting central plane when viewing the mask body from a top view. The first and second concave segments may be provided as "cut-outs" from the configuration of known prior art masks such as the 3M Brand 9000 Series flat fold mask.

FIGS. 1-5 illustrate an example of a new flat-fold, maintenance-free, respiratory mask 10 that includes a mask body 11 that has a top section or panel 12, a central panel 14, and a bottom panel 16. The panels 12, 14, and 16 are illustrated in an open condition—that is, the respirator 10 is ready for donning by a person. The central panel 14 is separated from the top panel 12 and the bottom panel 16 by first and second lines of demarcation 18 and 20. The top and bottom panels 12 and 16 may each be folded inward towards the backside of the central panel 14 when the mask is being stored (FIGS. 6-7) and may be opened outward for placement on a wearer's face (FIGS. 1-5). When the mask body 11 is taken from its open configuration to its closed configuration or vice versa, the top and bottom panels 12 and 16, respectively, rotate about the first and second lines of demarcation 18 and 20. In this sense, the first and second lines of demarcation 18 and 20 act as first and second hinges or axis, respectively, for the top and bottom panels 12 and 16. The respirator 10 may also be provided with first and second flanges or tabs 22 and 24 that provide a region for securement of a harness that may include straps or elastic bands 26. U.S. Pat. D449,377 to Henderson et al. shows an example of tabs that can be used as strap securement regions. The straps or bands 26 may be stapled, glued, welded, or otherwise secured to the mask body 11 at each flange 22, 24 to hold the mask body 11 against the wearer's face. An example of a compression element that could be used to fasten a harness to a mask body using ultrasonic welding is described in U.S. Pat. Nos. 6,729,332 and 6,705,317 to Castiglione. The band could also be welded directly to the mask body without using a separate attachment element—see U.S. Pat. No. 6,332,465 to Xue et al. Examples of other harnesses that could possibly be used are described in U.S. Pat. No. 5,394,568 to Brostrom et al. and U.S. Pat. No. 5,237,986 to Seppala et al. and in EP 608684A to Brostrom et al. The top panel 12 may include a nose clip 28 that is made from a malleable strip of metal such as aluminum, which metal strip can be conformed by mere finger pressure to adapt the respirator to the configuration of the wearer's face in the nose region. Suitable nose clips are cited above in the Background section. The nose clip can be disposed on the mask exterior or interior or may be disposed between the various layers that comprise the mask body.

Figure 3:
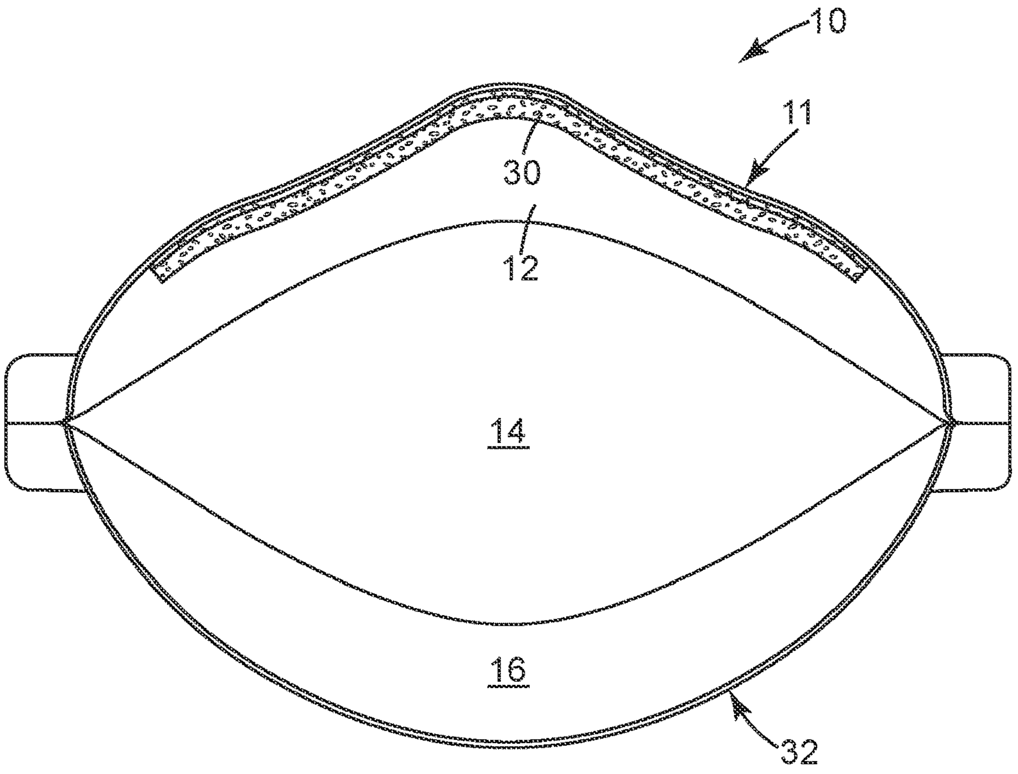
FIG. 3 illustrates a rear view of the respirator mask body 11 in accordance with the present invention.
Figure 4:
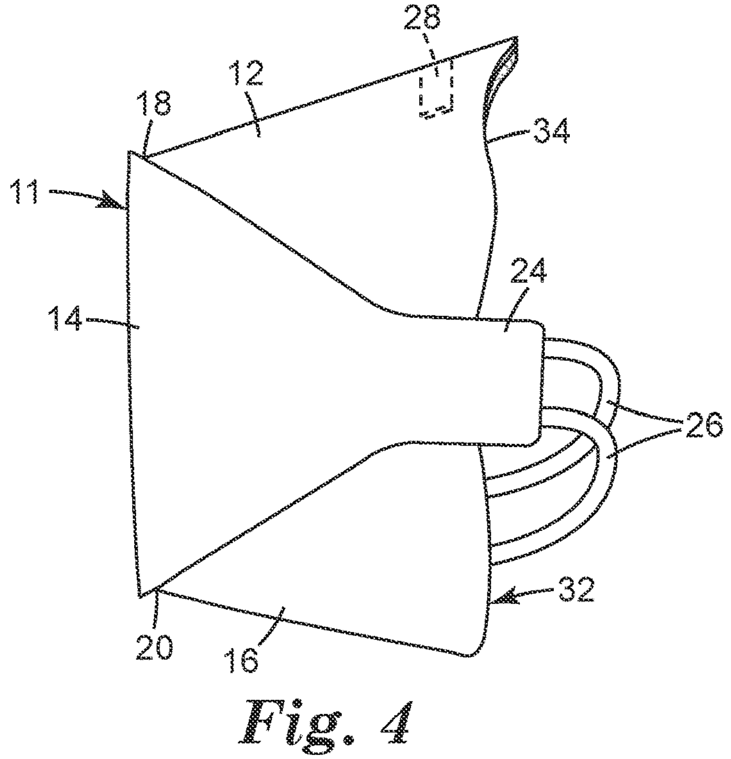
FIG. 4 illustrates a right side view of the respirator 10 in accordance with the present invention.

As shown in FIG. 3, the respirator 10 may also include a nose foam 30 that is disposed inwardly along the mask body perimeter 32 of the top panel 12. Examples of suitable nose foams are also mentioned above in the Background section of this document. The nose foam could extend around the whole inner perimeter of the mask body and could include a thermochromic fit-indicating material that contacts the wearer's face when the mask is worn. Heat from the facial contact causes the thermochromic material to change color to allow the wearer to determine if a proper fit has been established—see U.S. Pat. No. 5,617,749 to Springett et al. The mask body 11 also can have its intrinsic structure altered in the top section to increase pressure drop in that portion of the mask body so that eyewear fogging is less likely to occur—see U.S. patent application Ser. No. 11/743,716, entitled Maintenance Free Anti-Fog Respirator, filed on the same day as the present document under attorney case number 63051US002, now issued as U.S. Pat. No. 9,770,611

Figure 5A:
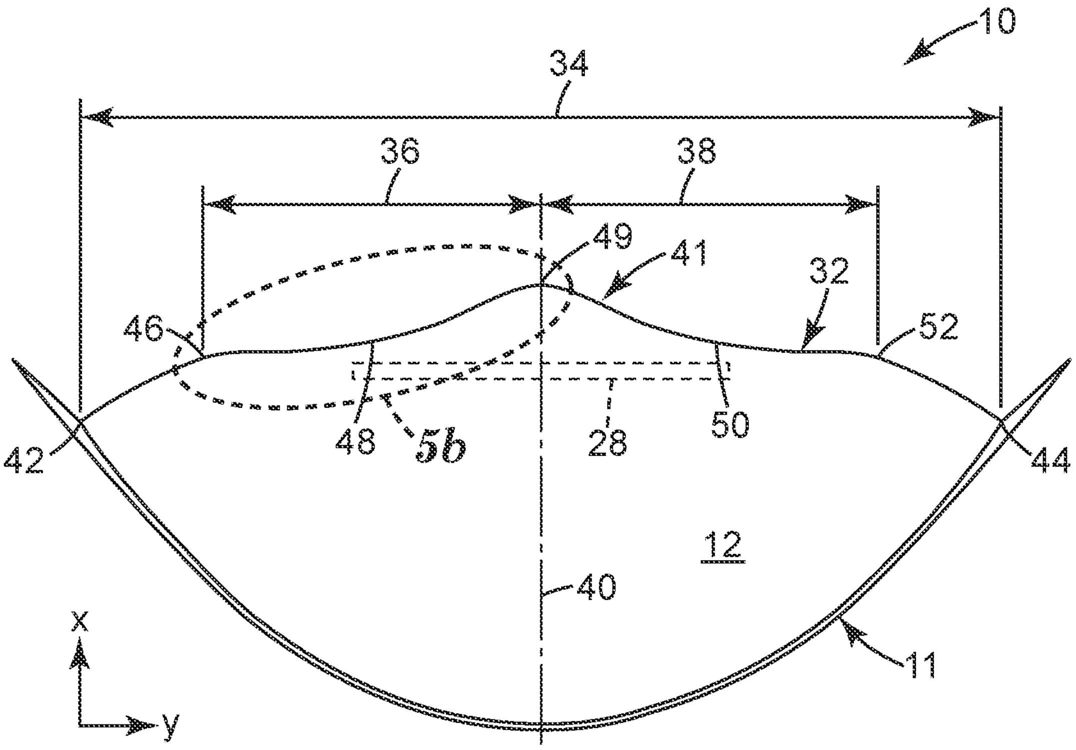
FIG. 5*a* illustrates a top view of the mask body 11 in accordance with the present invention.
Figure 5B:
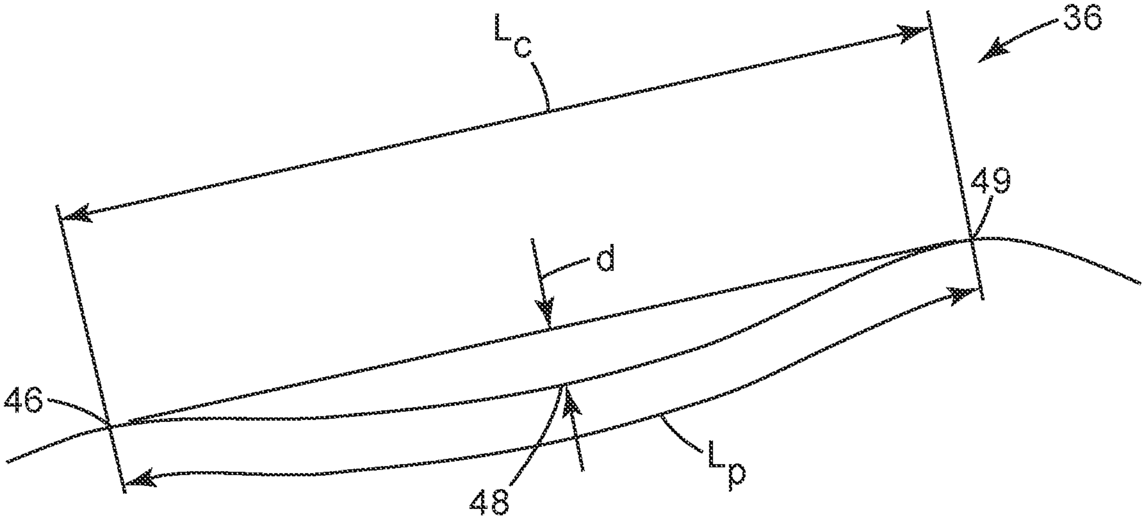
FIG. 5*b* is an enlarged view of the top view first concave segment 36 shown in FIG. 5*a;*

FIGS. 5*a* and 5*b* show that the mask body perimeter 32 has an upper segment 34 that comprises first and second concave segments 36 and 38 that are located, respectively, on first and second sides of a central plane 40 when viewing the mask body 11 through a plane projected onto a top view of the respirator. The nose clip 28 and the arrow line that represents the length of the upper segment 34 of the perimeter extends in the crosswise dimension of the mask body 11. The mask body perimeter 32 is shaped to contact the wearer's face over the nose bridge, across and around the cheeks, and under the chin. The mask body 11 forms an enclosed space around the nose and mouth of the wearer and can take on a curved, projected shape that resides in spaced relation to a wearer's face. Examples of other mask body shapes are shown in U.S. Pat. No. 7,131,442 to Kronzer et al., U.S. Pat. No. 6,923,182 to Angadjivand et al., U.S. Pat. No. 6,394,090 to Chen et al. (and D448,472 and D443,927 to Chen), U.S. Pat. No. 6,722,366 to Bostock et al., RE37,974 to Bowers, U.S. Pat. No. 4,827,924 to Japuntich, and U.S. Pat. No. 4,850,347 to Skov. The central plane 40 bisects the nose region 41 of the mask 11 such that symmetry is generally provided on each side of the plane 40. Moving along the upper segment 34 of the perimeter line 32 from the left side of the mask body 11 to the right side in the "y" direction, a line tangent to the upper segment of the perimeter decreases in slope at the onset of the first concave segment 36 relative to a previous tangent line and then begins to increase in slope relative to a previous tangent line moving along the upper segment of the perimeter towards the nose region 41. At the midsection of the mask, noted by plane 40, the tangent to the perimeter 32 is neutral or parallel to the "y" axis. On the other side of the central plane 40, a line tangent to the upper segment 34 of the perimeter decreases in slope and then increases again relative to a previous tangent line moving along the upper segment 34 towards the end on the right side. In each concave segment 36 and 38, the slope of a line tangent to the upper segment of the perimeter may, but not necessarily, include both a negative and positive slope. In the first concave segment 36, the slope of the tangent to the perimeter may be slightly negative before becoming positive (moving in the "y" direction). In the second concave segment 38, the slope of a line tangent to the upper segment 34 of the perimeter 32 may be negative before becoming slightly positive (moving along the perimeter in the "y" direction).

From the beginning of the perimeter 32 of upper segment 34 at point 42 to the opposing end point 44, there are five inflection points. The first inflection point 46 is located where the slope of the line tangent to the perimeter 32 begins to decrease; the second inflection point 48 occurs where the slope of the tangent begins to increase again; the third inflection point 49 is located approximately where the plane 40 bisects the mask body; the fourth inflection 50 occurs where the slope of the tangent begins to increase again; and the fifth inflection 52 occurs where the slope of the tangent begins to decrease again. The mask body 11 can exhibit the sculpted configuration along the upper segment 34 of the perimeter without any imposed conformance from a deformed nose clip.

As shown in FIG. 5*b*, each concave segment 36 (and 38) has a chord line Lc that extends between inflection points 46 (and 52), respectively, and the central plane 40. The chord line Lc has a length that is about 3 to 7 centimeters (cm), preferably about 4 to 6 cm, and more preferably about 5 cm. The path length Lp of the perimeter 32 of the first and second segments 36 (and 38) is typically about 0.5 to 5 millimeters (mm) greater than the chord length Lc, and typically is about 1 to 3 mm greater than Lc.

The depth d of each concave segment 36, 38 is about 2 to 11 millimeters, more typically about, 4 to 9 mm, and yet more typically about 5 to 7 mm.

Figure 6:
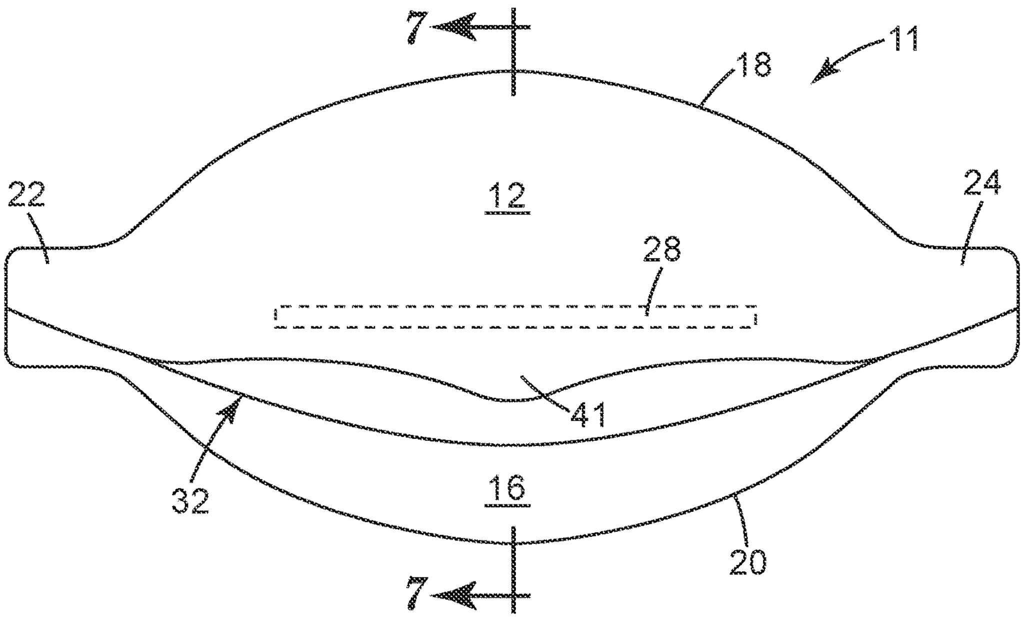
FIG. 6 illustrates a rear view of the mask body 11 in a folded condition.
Figure 7:
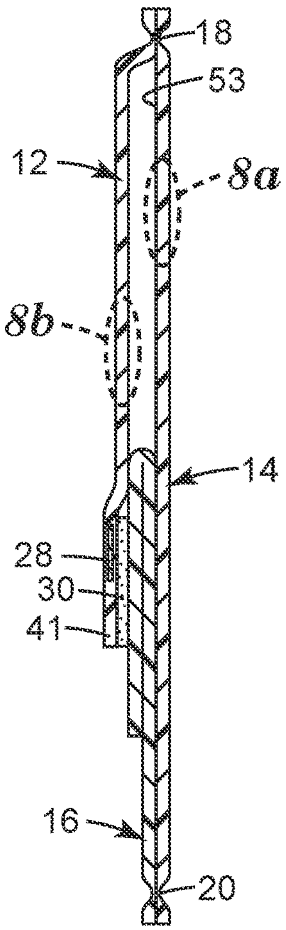
FIG. 7 is a cross-sectional view of the mask body 11 taken along lines 7-7 of FIG. 6.

As shown in FIGS. 6 and 7, the mask body 11 may be folded flat for storage. When placed in a folded condition, the top and bottom panels 12 and 16 may be folded inwardly towards a rear surface 53 of the central panel 14. Typically, the bottom panel 16 is folded inwardly before the top panel 12. The lower panel 16 may be folded back upon itself as shown in FIG. 7 so that it can be more easily grasped when opening the mask body from its folded condition. Each of the panels may include further folds, seams, pleats, ribs, etc. to assist furnishing the mask with structure and/or distinctive appearance. One or more tabs may be included along the perimeter 32 to assist in opening the mask body 11 from its folded condition to its open ready-to-use condition—see U.S. patent application Ser. No. 11/743,723, entitled Maintenance-Free Flat-Fold Respirator That Includes A Graspable Tab filed on the same day as the subject document under attorney case number 62914US002.

Figure 8A:
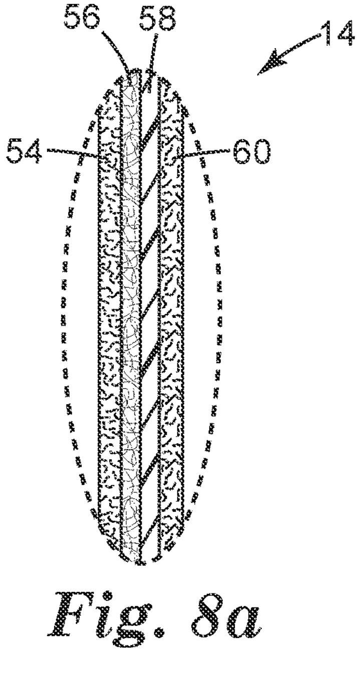
FIGS. 8*a* and 8*b* show enlarged cross-sections of the central and top panels, respectively.
Figure 8B:
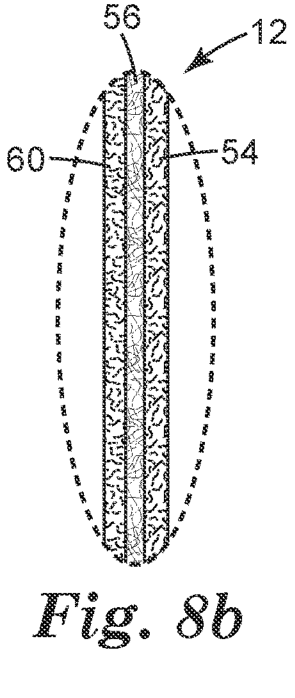

As shown in FIGS. 8*a* and 8*b*, the mask body may comprise a plurality of layers. These layers may include an inner and outer cover web 54, a filtration layer 56, a stiffening layer 58, and an outer cover web 60. Maintenance-free respirators of a flat-fold configuration can be manufactured according to the process described in U.S. Pat. Nos. 6,123,077, 6,484,722, 6,536,434, 6,568,392, 6,715,489, 6,722,366, 6,886,563, 7,069,930, and US Patent Publication No. US2006/0180152A1 and EP0814871B1 to Bostock et al.

The mask body may include a shaping layer if it is molded into its desired cup-shaped configuration for donning. The layers that comprise the mask body may be joined together at the perimeter using various techniques, including adhesive bonding and ultrasonic welding. Examples of suitable bond patterns are shown in U.S. Pat. D416,323 to Henderson et al. Descriptions of these various layers and how they may be constructed are set forth below.

Stiffening Layer

The mask body may optionally include a stiffening layer in one or more of the mask panels. The purpose of the stiffening layer is, as its name implies, to increase the stiffness of the panel(s) or parts of the mask body relative to other panels or parts. Stiffer panels may help support the mask body off of the face of the user. The stiffening layer may be located in any combination of the panels but is preferably located in the central panel of the mask body. Giving support to the center of the mask helps prevent the mask body from collapsing onto the nose and mouth of the user when in use, while leaving the top and bottom panels relatively compliant to aid sealing to the wearer's face. The stiffening layer may be positioned at any point within the layered construction of the panel and typically is juxtaposed against the outer cover web.

The stiffening layer can be formed from any number of web based materials. These materials may include open mesh like structures or fibrous webs made of any number of commonly available polymers, including polypropylene, polyethylene, and the like. The stiffening layer also could be derived from a spun bond web based material, again made from either polypropylene or polyethylene. The distinguishing property of the stiffening layer is that its stiffness relative to the other layers within the mask body is greater.

Filtration Layer

Filter layers used in a mask body of the invention can be of a particle capture or gas and vapor type. The filter layer also may be a barrier layer that prevents the transfer of liquid from one side of the filter layer to another to prevent, for instance, liquid aerosols or liquid splashes from penetrating the filter layer. Multiple layers of similar or dissimilar filter types may be used to construct the filtration layer of the invention as the application requires. Filters that may be beneficially employed in a layered mask body of the invention are generally low in pressure drop (for example, less than about 20 to 30 mm $H_2O$ at a face velocity of 13.8 centimeters per second) to minimize the breathing work of the mask wearer. Filtration layers additionally are flexible and have sufficient shear strength so that they generally retain their structure under the expected use conditions. Generally the shear strength is less than that either the adhesive or shaping layers. Examples of particle capture filters include one or more webs of fine inorganic fibers (such as fiberglass) or polymeric synthetic fibers. Synthetic fiber webs may include electret charged polymeric microfibers that are produced from processes such as meltblowing. Polyolefin microfibers formed from polypropylene that has been electret charged to provide particular utility for particulate capture applications. An alternate filter layer may comprise an sorbent component for removing hazardous or odorous gases from the breathing air. Sorbents may include powders or granules that are bound in a filter layer by adhesives, binders, or fibrous structures—see U.S. Pat. No. 3,971,373 to Braun. A sorbent layer can be formed by coating a substrate, such as fibrous or reticulated foam, to form a thin coherent layer. Sorbent materials may include activated carbons that are chemically treated or not, porous alumna-silica catalyst substrates, and alumna particles.

The filtration layer is typically chosen to achieve a desired filtering effect and, generally, removes a high percentage of particles and/or or other contaminants from the gaseous stream that passes through it. For fibrous filter layers, the fibers selected depend upon the kind of substance to be filtered and, typically, are chosen so that they do not become bonded together during the molding operation. As indicated, the filtration layer may come in a variety of shapes and forms. It typically has a thickness of about 0.2 millimeters (mm) to 1 centimeter (cm), more typically about 0.3 millimeters to 0.5 cm, and it could be a planar web coextensive with a shaping or stiffening layer, or it could be a corrugated web that has an expanded surface area relative to the shaping layer—see, for example, U.S. Pat. Nos. 5,804,295 and 5,656,368 to Braun et al. The filtration layer also may include multiple layers of filter media joined together by an adhesive component. Essentially any suitable material that is known for forming a filtering layer of a direct-molded respiratory mask may be used for the filtering material. Webs of melt-blown fibers, such as taught in Wente, Van A., *Superfine Thermoplastic Fibers,* 48 Indus. Engn. Chem., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation Of Airborne Dust Particles*, Institution Of Mechanical Engineers, London, Proceedings 1B, 1952. Particularly preferred are BMF webs that contain fibers formed from polypropylene, poly(4-methyl-1-pentene), and combinations thereof. Electrically charged fibrillated-film fibers as taught in van Turnhout, U.S. Pat. Re. 31,285, may also be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and 6,375,886 and 5,496,507 to Angadjivand et al. Electric charge may also be impacted to the fibers by corona charging as disclosed in U.S. Pat. No. 4,588,537 to Klasse et al. or tribocharging as disclosed in U.S. Pat. No. 4,798,850 to Brown. Also, additives can be included in the fibers to enhance the filtration performance of webs produced through the hydro-charging process (see U.S. Pat. No. 5,908,598 to Rousseau et al.). Fluorine atoms, in particular, can be disposed at the surface of the fibers in the filter layer to improve filtration performance in an oily mist environment—see U.S. Pat. Nos. 6,398,847 B1, 6,397,458 B1, and 6,409,806 B1 to Jones et al. Typical basis weights for electret BMF filtration layers are about 15 to 100 grams per square meter. When electrically charged according to techniques described in, for example, the '507 patent, and when including fluorine atoms as mentioned in the Jones et al. patents, the basis weight may be about 20 to 40 $g/m^2$ and about 10 to 30 $g/m^2$, respectively.

Cover Web

An inner cover web could be used to provide a smooth surface for contacting the wearer's face, and an outer cover web could be used to entrap loose fibers in the mask body or for aesthetic reasons. A cover web typically does not provide any significant shape retention to the mask body. To obtain a suitable degree of comfort, an inner cover web preferably has a comparatively low basis weight and is formed from comparatively fine fibers. More particularly, the cover web may be fashioned to have a basis weight of about 5 to 50 g/m$^2$ (typically 10 to 30 g/m$^2$), and the fibers are less than 3.5 denier (typically less than 2 denier, and more typically less than 1 denier). Fibers used in the cover web often have an average fiber diameter of about 5 to 24 micrometers, typically of about 7 to 18 micrometers, and more typically of about 8 to 12 micrometers.

The cover web material may be suitable for use in the molding procedure by which the mask body is formed, and to that end, advantageously, has a degree of elasticity (typically, but not necessarily, 100 to 200% at break) or is plastically deformable.

Suitable materials for the cover web are blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum.

A typical cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material after the molding operation without requiring an adhesive between the layers. Typical materials for the cover web are polyolefin BMF materials that have a basis weight of about 15 to 35 grams per square meter (g/m$^2$) and a fiber denier of about 0.1 to 3.5, and are made by a process similar to that described in the ’816 patent. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin “Escorene 3505G” from Exxon Corporation and having a basis weight of about 25 g/m$^2$ and a fiber denier in the range 0.2 to 3.1 (with an average, measured over 100 fibers of about 0.8). Another suitable fiber is a polypropylene/polyethylene BMF (produced from a mixture comprising 85 percent of the resin “Escorene 3505G” and 15 percent of the ethylene/alpha-olefin copolymer “Exact 4023” also from Exxon Corporation) having a basis weight 25 g/m$^2$ and an average fiber denier of about 0.8. Other suitable materials may include spunbond materials available, under the trade designations “Corosoft Plus 20”, “Corosoft Classic 20” and “Corovin PP-S-14”, from Corovin GmbH of Peine, Germany, and a carded polypropylene/viscose material available, under the trade designation “370/15”, from J. W. Suominen OY of Nakila, Finland.

Cover webs that are used in the invention preferably have very few fibers protruding from the surface of the web after processing and therefore have a smooth outer surface. Examples of cover webs that may be used in the present invention are disclosed, for example, in U.S. Pat. No. 6,041,782 to Angadjivand, U.S. Pat. No. 6,123,077 to Bostock et al., and WO 96/28216A to Bostock et al.

Shaping Layer

If the mask body takes on a molded configuration, rather than the illustrated flat-fold configuration, the mask body may contain a shaping layer that supports a filtration layer on its inner or outer sides. A second shaping layer that has the same general shape as the first shaping layer also could be used on each side of the filtration layer. The shaping layer’s function is primarily to maintain the shape of the mask body and to support the filtration layer. Although an outer shaping layer also may function as a coarse initial filter for air that is drawn into the mask, the predominant filtering action of the respirator is provided by the filter media.

The shaping layers may be formed from at least one layer of fibrous material that can be molded to the desired shape with the use of heat and that retains its shape when cooled. Shape retention is typically achieved by causing the fibers to bond to each other at points of contact between them, for example, by fusion or welding. Any suitable material known for making a shape-retaining layer of a direct-molded respiratory mask may be used to form the mask shell, including a mixture of synthetic staple fiber, preferably crimped, and bicomponent staple fiber. Bicomponent fiber is a fiber that includes two or more distinct regions of fibrous material, typically distinct regions of polymeric materials. Typical bicomponent fibers include a binder component and a structural component. The binder component allows the fibers of the shape-retaining shell to be bonded together at fiber intersection points when heated and cooled. During heating, the binder component flows into contact with adjacent fibers. The shape-retaining layer can be prepared from fiber mixtures that include staple fiber and bicomponent fiber in a weight-percent ratios that may range, for example, from 0/100 to about 75/25. Preferably, the material includes at least 50 weight-percent bicomponent fiber to create a greater number of intersection bonding points, which, in turn, increase the resilience and shape retention of the shell.

Suitable bicomponent fibers that may be used in the shaping layer include, for example, side-by-side configurations, concentric sheath-core configurations, and elliptical sheath-core configurations. One suitable bicomponent fiber is the polyester bicomponent fiber available, under the trade designation “KOSA T254” (12 denier, length 38 mm), from Kosa of Charlotte, North Carolina, U.S.A., which may be used in combination with a polyester staple fiber, for example, that available from Kosa under the trade designation “T259” (3 denier, length 38 mm) and possibly also a polyethylene terephthalate (PET) fiber, for example, that available from Kosa under the trade designation “T295” (15 denier, length 32 mm). The bicomponent fiber also may comprise a generally concentric sheath-core configuration having a core of crystalline PET surrounded by a sheath of a polymer formed from isophthalate and terephthalate ester monomers. The latter polymer is heat softenable at a temperature lower than the core material. Polyester has advantages in that it can contribute to mask resiliency and can absorb less moisture than other fibers.

The shaping layer also can be prepared without bicomponent fibers. For example, fibers of a heat-flowable polyester can be included together with staple, preferably crimped, fibers in a shaping layer so that, upon heating of the web material, the binder fibers can melt and flow to a fiber intersection point where it forms a mass, that upon cooling of the binder material, creates a bond at the intersection point. A mesh or net of polymeric strands also could be used in lieu of thermally bondable fibers. An example of this type of a structure is described in U.S. Pat. No. 4,850,347 to Skov.

When a fibrous web is used as the material for the shape-retaining shell, the web can be conveniently prepared on a "Rando Webber" air-laying machine (available from Rando Machine Corporation, Macedon, New York) or a carding machine. The web can be formed from bicomponent fibers or other fibers in conventional staple lengths suitable for such equipment. To obtain a shape-retaining layer that has the required resiliency and shape-retention, the layer preferably has a basis weight of at least about 100 g/m$^2$, although lower basis weights are possible. Higher basis weights, for example, approximately 150 or more than 200 g/m$^2$, may provide greater resistance to deformation. Together with these minimum basis weights, the shaping layer typically has a maximum density of about 0.2 g/cm$^2$ over the central area of the mask. Typically, the shaping layer has a thickness of about 0.3 to 2.0 mm, more typically about 0.4 to 0.8 mm. Examples of molded maintenance-free respirators that use shaping layers are described in U.S. Pat. No. 7,131,442 to Kronzer et al., U.S. Pat. No. 6,293,182 to Angadjivand et al., U.S. Pat. No. 4,850,347 to Skov; U.S. Pat. No. 4,807,619 to Dyrud et al., and U.S. Pat. No. 4,536,440 to Berg.

Molded maintenance-free respirators also may be made without using a separate shaping layer to support the filtration layer. In these respirators, the filtration layer also acts as the shaping layer—see U.S. Pat. No. 6,827,764 to Springett et al. and U.S. Pat. No. 6,057,256 to Krueger et al.

The respirator also may include an optional exhalation valve that allows for the easy exhalation of air by the user. Exhalation valves that exhibit an extraordinary low pressure drop during an exhalation are described in U.S. Pat. Nos. 7,188,622, 7,028,689, and 7,013,895 to Martin et al.; 7,117,868, 6,854,463, 6,843,248, and 5,325,892 to Japuntich et al.; and 6,883,518 to Mittelstadt et al. The exhalation valve may be secured to the central panel, preferably near the middle of the central panel, by a variety of means including sonic welds, adhesion bonding, mechanical clamping, and the like—see, for example, U.S. Pat. Nos. 7,069,931, 7,007,695, 6,959,709, and 6,604,524 to Curran et al and EP1,030,721 to Williams et al.

Eyewear Compatibility Study

This study is carried out to determine the amount of physical overlap between a maintenance-free respirator and protective eyewear and to evaluate compatibility between the two items of personal protective equipment (PPE). Both the conventional and inventive respirators are fitted onto separate Sheffield dummy heads as used in EN149:2001 European Standard. Various safety eyewear is then fitted to the Sheffield dummy head across the nose bridge region. Digital photographs are then taken of each combination of conventional respirator and the safety eyewear, as well as the inventive respirator and the safety eyewear, to enable an observation of overlap between the two items of PPE. The conventional respirator that was used for comparative purposes was a 3M Brand 9322 respirator available from the 3M Company, Occupational Health & Environmental Safety Division, St. Paul, Minnesota. This respirator has a configuration similar to the respirator shown in U.S. Pat. D449,377 to Henderson et al, Des. 424,688 to Bryant et al., and Des. 416,323 Henderson et al. The inventive maintenance-free respirator had the following construction:

EXAMPLE

Top and Bottom Panels:

One 50 grams per square meter (gsm) spunbond polypropylene coverweb, Type 105OB1UO0, available from Don and Low Nonwovens, Forfar, Scotland, United Kingdom (Outer layer);

Two electrically-charged, melt blown polypropylene microfiber filter layers having a basis weight of 100 g/m., an effective fiber diameter of 7 to 8 microns, and a thickness of about 1 mm; and Smooth melt blown polypropylene microfiber (inner layer).

Central Panel:

One 90 gram per meter (gsm) spunbond polypropylene XAVAN 5261W Stiffening layer (inserted immediately under the outer cover web; available from E.I. DuPont de Nemours, Luxembourg, France).

Mask Assembly:

Lengths of these panel constructions are laid up in to 5 meter (m) strips and die-cut using an hydraulic swing press into the correct shapes (approx 350 mm by 300 mm) for each of the three panels. The top, bottom, and the central panel blanks are each individually cut.

The bottom panel was placed into an ultrasonic welding machine such that the cut profiled edge of the panel is positioned over the weld anvil. The welding machine was cycled with the weld time set at 500 milliseconds (ms), and the bottom panel weld was completed.

The upper panel was processed in the same way using an ultrasonic weld press set at the same setting but with a weld anvil to match the upper cut edge profile. Further finishing operation were then performed to fit a strip of 25 mm wide open cell polyurethane nose foam to the outer surface of the inner web adjacent to the welded profiled edge. This was then cut to match the profile of the upper panel edge. A strip of 5 mm×0.7 mm×140 mm malleable aluminum was fixed to the inner surface of the outer cover web using a hot-melt adhesive.

The center panel blank was positioned onto an ultrasonic welder press, and the valve hole was cut. An exhalation valve was then inserted in the welder and the welder, set to 600 ms weld time, was cycled again to weld the valve at the opening.

All three panels were now complete and ready to be combined to produce the mask body of the respirator.

Utilizing an ultrasonic welding press that had a welding anvil of a profile that matched the perimeter weld, all three panels were joined together. The center panel was first laid across the weld anvil using locating marks to position the center panel relative perimeter profile, with the valve facing downwards and smooth BMF facing upwards. The weld anvil was mounted on a traversing bed, such that it could be moved back and forth, under the weld horn. The lower panel was then located using locating marks across the center panel with the outer web facing upwards. The upper panel was then positioned across the center panel and the lower panel using location marks, with the outer web facing upwards. All the panels were then joined together starting with the lower panel to the center panel. The welding cycle was then initiated for welding the lower panel to the center panel by positioning the anvil under the welding horn. This was repeated for the upper panel. The dimensions of Lc, Lp, and d shown in FIG. 5*b* had the dimensions of 49 mm, 50 mm, and 6 mm, respectively.

The mask body was complete and the harness headbands were attached. Two polyisoprene bands about 21 cm long were cut to match the mask body length in the crosswise dimension. Utilizing a manual staple gun, and orientating the mask body so that the staple legs, when penetrating the mask body, will fold over on the outer surface, the headband was stapled at either extremity of the product. This operation was conducted twice, offering an upper and lower headband, on the back of the product.

In making a respirator of this example, reference also may be made to the Bostock et al. patents cited above.

The inventive respirator was donned by a number of individuals at the 3M Company and was found to make a snug fit to the wearer's face.

The inventive respirator also was subjected to the Eyewear Compatibility Study for 19 different types of eyewear. The test results are set forth below in Table 1:

TABLE 1

| Safety Eyewear Brand | Eyewear Compatibility Test Result |
|---|---|
| 3M 2720 | Eliminated |
| 3M 2730 | Eliminated |
| 3M 2740 | Reduced |
| AOS Elys | Reduced |
| AOS 3000 | Eliminated |
| AOS X sport | Eliminated |
| Bolle Axis | Eliminated |
| Bolle Frisco | Reduced |
| Crews Storm | Reduced |
| Galileo Alligator | Reduced |
| Galileo Raptor | Eliminated |
| Pulsafe Milenia | Eliminated |
| Pulsafe Optema | Eliminated |
| Pulsafe XC | Reduced |
| Uvex Cybric | Eliminated |
| Uvex Gravity | Reduced |
| Uvex Ivo | Reduced |
| Uves Skylite | Reduced |
| Uves Skyper | Reduced |

The test results show that there was no overlap between the eyewear and the respirator mask body in half of the tested eyewear. The remaining half of the eyewear exhibited reduced overlap. Thus, the compatibility between the two items of PPE was enhanced when compared to an unmodified respirator, which exhibited substantial overlap between the PPE across all 19 sets of eyewear.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent that there is a conflict or discrepancy between the disclosure in such incorporated document and the above specification, the above specification will control.

PARTS LIST

Part No. Item
10 Respirator
11 Mask body
12 Top section or panel
14 Central panel
16 Bottom panel
18 First line of demarcation
20 Second line of demarcation
22 First tabs
24 Second tabs
26 Straps or elastic bands
28 Nose clip
30 Nose foam
32 Perimeter
34 Upper segment
36 First concave segment
38 Second concave segment
40 Central plane
41 Nose region
42 Point
43
44 Opposing end
45
46 First inflection point
47
48 Second inflection point
49 Third inflection point
50 Fourth inflection point
52 Fifth inflection point
54 Inner cover web
56 Filtration layer
58 Stiffening layer
60 Outer cover web

What is claimed is:

1. A respirator, comprising:

a mask harness; and a mask body that includes at least one layer of filter media, wherein the filter media is an air-permeable structure that is designed to remove contaminants from air that passes through it, the mask body having a perimeter that includes an upper segment and a lower segment, wherein the perimeter of the mask body is shaped to contact a wearer's face over the nose bridge, across and around the cheeks, and under the chin, and wherein the upper segment comprises first and second concave segments viewable in a top view plane that is projected onto a top view of the respirator when the respirator is in an open condition, wherein the first and second concave segments are located, respectively, on first and second sides of a central plane when viewing the mask body through the top view plane.

2. The respirator of claim 1, wherein the upper segment of the perimeter further comprises first and second convex segments viewable in the top view plane and that are located, respectively, on first and second sides of the central plane when viewing the mask body through the top view plane.

3. The respirator of claim 1, wherein the mask body forms an enclosed space around the nose and mouth of the wearer, when the respirator is being donned by a person.

4. The respirator of claim 3, wherein the mask body is an air-permeable structure that is configured to fit over the nose and mouth of a wearer and defines an interior gas space, wherein the interior gas space is the space between the mask body and the wearer's face.

5. The respirator of claim 1, wherein in the open condition the mask body takes on a curved, projected shape that is configured to enclose the nose and mouth of the wearer.

6. The respirator of claim 5, wherein the mask harness is configured to hold the mask body against the wearer's face to enclose the nose and mouth of the wearer.

7. A respirator, comprising:

a mask harness; and a mask body that includes at least one layer of filter media, the mask body having an upper segment perimeter extending between a first point and a second point, and wherein the upper segment perimeter comprises first and second concave segments viewable in a top view plane that is projected onto a top view of the respirator when the respirator is in an open condition, wherein the first and second concave segments are located, respectively, on first and second sides of a central plane when viewing the mask body through the top view plane, wherein the upper segment perimeter further comprises first and second convex segments viewable in the top view plane and that are located, respectively, on first and second sides of the central plane when viewing the mask body through the top view plane, wherein the upper segment perimeter has a first inflection point, a second inflection point, a third inflection point, a fourth inflection point, and a fifth infection point when viewing the mask body through the top view plane, wherein the first convex segment is located between the first point and the first inflection point, wherein the first concave segment is located between the first inflection point and the third inflection point, wherein the second concave segment is located between the third inflection point and the fifth inflection point, and wherein the second convex segment is located between the fifth inflection point and the second point.

8. The maintenance-free respirator of claim 7, wherein the first inflection point is located approximately where a slope of a line tangent to the upper segment perimeter begins to decrease, wherein the second inflection point is located approximately where the slope of the line tangent begins to increase again, wherein the third inflection point is located approximately where the central plane bisects the mask body, wherein the fourth inflection point is located approximately where the slope of the line tangent begins to increase again, and wherein the fifth inflection point is located approximately where the slope of the line tangent begins to decrease again.

* * * * *